(12) United States Patent
Watson

(10) Patent No.: US 8,572,104 B2
(45) Date of Patent: Oct. 29, 2013

(54) SALES OF COLLECTIONS EXCLUDING THOSE ALREADY PURCHASED

(75) Inventor: Stephen Watson, Toronto (CA)

(73) Assignee: Kaleidescape, Inc., Sunnyvale, CA (US)

( * ) Notice: Subject to any disclaimer, the term of this patent is extended or adjusted under 35 U.S.C. 154(b) by 0 days.

(21) Appl. No.: 10/991,085

(22) Filed: Nov. 17, 2004

(65) Prior Publication Data

US 2005/0120053 A1    Jun. 2, 2005

Related U.S. Application Data

(63) Continuation-in-part of application No. 10/418,739, filed on Apr. 18, 2003, now Pat. No. 7,231,607, and a continuation-in-part of application No. 10/418,949, filed on Apr. 18, 2003, now Pat. No. 7,246,322, and a continuation-in-part of application No. 10/964,566, filed on Oct. 12, 2004, and a continuation-in-part of application No. 10/964,565, filed on Oct. 12, 2004, now abandoned, and a continuation-in-part of application No. 10/932,330, filed on Aug. 31, 2004, and a continuation-in-part of application No. 10/936,789, filed on Sep. 8, 2004, now abandoned.

(51) Int. Cl.
  *G06F 17/30* (2006.01)
  *G06F 7/00* (2006.01)

(52) U.S. Cl.
  USPC .......................................... 707/758; 707/913

(58) Field of Classification Search
  USPC ........ 707/1–2, 10, 3, 4, 104.1, 100–102, 758; 705/26, 57, 59, 27
  See application file for complete search history.

(56) References Cited

U.S. PATENT DOCUMENTS

| | | |
|---|---|---|
| 3,801,239 A | 4/1974 | Larson |
| 4,992,940 A | 2/1991 | Dworkin |
| 5,335,277 A | 8/1994 | Harvey et al. |
| 5,337,357 A | 8/1994 | Chou et al. |
| 5,392,244 A | 2/1995 | Jacobson et al. |
| 5,410,415 A | 4/1995 | Parulski et al. |
| 5,457,791 A | 10/1995 | Matsumoto et al. |

(Continued)

FOREIGN PATENT DOCUMENTS

| | | |
|---|---|---|
| EP | 1 199 647 A2 | 4/2002 |
| JP | 05 137090 A | 6/1993 |

(Continued)

OTHER PUBLICATIONS

Chu et al. "A secure multicast protocol with copyright protection." ACM SIGCOMM Computer Comm. Review, Apr. 2002, pp. 42-60, vol. 32, No. 2.

(Continued)

*Primary Examiner* — Kimberly Wilson

(57) ABSTRACT

The invention provides a method and system capable of allowing users to complete collections of objects without unwanted duplication thereof. The system automatically, and in response to user direction, determines if objects are available that would complete a user's collection. The system can automatically purchase and obtain delivery of objects identified as being needed to complete a collection. The system allows a user to statically define and derive the parameters of a desired collection of objects and can create, and suggest to the user, collections of which the user already has a portion. The system includes functionality that provides user-definable collections.

55 Claims, 3 Drawing Sheets

(56) References Cited

U.S. PATENT DOCUMENTS

| | | | |
|---|---|---|---|
| 5,615,352 A | 3/1997 | Jacobson et al. | |
| 5,724,327 A | 3/1998 | Timmermans et al. | |
| 5,765,176 A | 6/1998 | Bloomberg | |
| 5,805,799 A | 9/1998 | Fredrickson et al. | |
| 5,896,454 A | 4/1999 | Cookson et al. | |
| 5,907,618 A | 5/1999 | Gennaro et al. | |
| 5,946,665 A | 8/1999 | Suzuki et al. | |
| 5,991,804 A | 11/1999 | Bolosky et al. | |
| 6,009,525 A | 12/1999 | Horstmann et al. | |
| 6,029,195 A * | 2/2000 | Herz | 725/116 |
| 6,035,373 A | 3/2000 | Iwata | |
| 6,052,759 A | 4/2000 | Stallmo et al. | |
| 6,182,069 B1 | 1/2001 | Niblack et al. | |
| 6,188,728 B1 | 2/2001 | Hurst | |
| 6,192,139 B1 | 2/2001 | Tao | |
| 6,205,249 B1 | 3/2001 | Moskowitz | |
| 6,209,092 B1 | 3/2001 | Linnartz | |
| 6,236,727 B1 | 5/2001 | Ciacelli et al. | |
| 6,243,725 B1 | 6/2001 | Hempleman et al. | |
| 6,260,024 B1 | 7/2001 | Shkedy | |
| 6,304,942 B1 | 10/2001 | DeKoning | |
| 6,349,143 B1 | 2/2002 | Hastings et al. | |
| 6,366,910 B1 | 4/2002 | Rajaraman et al. | |
| 6,374,036 B1 | 4/2002 | Ryan et al. | |
| 6,393,158 B1 | 5/2002 | Gould et al. | |
| 6,411,725 B1 | 6/2002 | Rhoads | |
| 6,438,235 B2 | 8/2002 | Sims, III | |
| 6,460,023 B1 | 10/2002 | Bean et al. | |
| 6,463,426 B1 | 10/2002 | Lipson et al. | 707/3 |
| 6,463,431 B1 | 10/2002 | Schmitt | |
| 6,473,867 B2 | 10/2002 | Yamamoto et al. | |
| 6,550,011 B1 | 4/2003 | Sims, III | |
| 6,563,935 B1 | 5/2003 | Echizen et al. | |
| 6,614,914 B1 | 9/2003 | Rhoads et al. | |
| 6,618,035 B1 | 9/2003 | Reza | |
| 6,625,581 B1 | 9/2003 | Perkowski | |
| 6,629,097 B1 | 9/2003 | Keith | |
| 6,633,653 B1 | 10/2003 | Hobson et al. | |
| 6,642,939 B1 | 11/2003 | Vallone et al. | 715/721 |
| 6,658,391 B1 * | 12/2003 | Williams et al. | 705/10 |
| 6,693,236 B1 | 2/2004 | Gould et al. | |
| 6,694,041 B1 | 2/2004 | Brunk | |
| 6,701,391 B1 | 3/2004 | Ayat et al. | |
| 6,714,683 B1 | 3/2004 | Tian et al. | |
| 6,728,213 B1 | 4/2004 | Tzeng et al. | |
| 6,772,340 B1 | 8/2004 | Peinado et al. | |
| 6,799,224 B1 | 9/2004 | Dellaconna | |
| 6,801,999 B1 | 10/2004 | Venkatesan et al. | |
| 6,839,680 B1 * | 1/2005 | Liu et al. | 705/10 |
| 6,851,082 B1 | 2/2005 | Corbett | |
| 6,889,302 B2 | 5/2005 | Gibble et al. | |
| 6,889,383 B1 | 5/2005 | Jarman | |
| 6,904,151 B2 | 6/2005 | Deguillaume et al. | |
| 6,904,410 B1 * | 6/2005 | Weiss et al. | 705/27 |
| 6,957,232 B2 | 10/2005 | Hoeye et al. | |
| 6,971,013 B2 | 11/2005 | Mihcak et al. | |
| 7,002,603 B2 | 2/2006 | Tapson | |
| 7,003,131 B2 | 2/2006 | Watson et al. | |
| 7,010,809 B2 | 3/2006 | Hori et al. | |
| 7,032,093 B1 | 4/2006 | Cameron | |
| 7,032,177 B2 | 4/2006 | Novak et al. | |
| 7,036,024 B2 | 4/2006 | Watson | |
| 7,076,737 B2 | 7/2006 | Abbott et al. | |
| 7,099,491 B2 | 8/2006 | Takaku | |
| 7,111,171 B2 | 9/2006 | Collens et al. | |
| 7,151,831 B2 | 12/2006 | Candelore et al. | |
| 7,181,044 B2 | 2/2007 | Watson et al. | |
| 7,188,248 B2 | 3/2007 | Watson | |
| 7,231,607 B2 | 6/2007 | Neely et al. | |
| 7,246,322 B2 | 7/2007 | Neely et al. | |
| 7,257,732 B2 | 8/2007 | Zarnke et al. | |
| 2001/0037465 A1 | 11/2001 | Hart et al. | |
| 2001/0039659 A1 | 11/2001 | Simmons et al. | |
| 2001/0051996 A1 | 12/2001 | Cooper et al. | |
| 2001/0056398 A1 | 12/2001 | Scheirer | |
| 2002/0029187 A1 * | 3/2002 | Meehan et al. | 705/37 |
| 2002/0054174 A1 | 5/2002 | Abbott et al. | |
| 2002/0069218 A1 | 6/2002 | Sull et al. | |
| 2002/0085713 A1 | 7/2002 | Feig et al. | |
| 2002/0087876 A1 | 7/2002 | Larose | |
| 2002/0095582 A1 | 7/2002 | Peled et al. | |
| 2002/0106192 A1 | 8/2002 | Sako | |
| 2002/0116707 A1 | 8/2002 | Morris et al. | |
| 2002/0118299 A1 | 8/2002 | Kahn | |
| 2002/0138741 A1 | 9/2002 | Koch | |
| 2002/0150277 A1 | 10/2002 | Nishimoto et al. | 382/100 |
| 2002/0169789 A1 | 11/2002 | Kutay et al. | |
| 2002/0172394 A1 | 11/2002 | Venkatesan et al. | |
| 2002/0174021 A1 | 11/2002 | Chu et al. | |
| 2002/0178077 A1 | 11/2002 | Katz et al. | |
| 2002/0178192 A1 | 11/2002 | Namioka | |
| 2002/0196939 A1 | 12/2002 | Unger et al. | |
| 2002/0196976 A1 | 12/2002 | Mihcak et al. | |
| 2003/0009671 A1 | 1/2003 | Yacobi et al. | |
| 2003/0014751 A1 * | 1/2003 | Paek | 725/30 |
| 2003/0018972 A1 | 1/2003 | Arora | |
| 2003/0030752 A1 | 2/2003 | Begeja | |
| 2003/0040850 A1 | 2/2003 | Najmi et al. | |
| 2003/0050818 A1 | 3/2003 | Maie | |
| 2003/0074253 A1 * | 4/2003 | Scheuring et al. | 705/10 |
| 2003/0078930 A1 | 4/2003 | Surcouf et al. | |
| 2003/0081857 A1 | 5/2003 | Tapson | |
| 2003/0084298 A1 | 5/2003 | Messerges et al. | |
| 2003/0097357 A1 * | 5/2003 | Ferrari et al. | 707/3 |
| 2003/0107676 A1 | 6/2003 | Jang | |
| 2003/0110503 A1 | 6/2003 | Perkes | |
| 2003/0126599 A1 | 7/2003 | Novak et al. | |
| 2003/0131353 A1 * | 7/2003 | Blom et al. | 725/25 |
| 2003/0139971 A1 | 7/2003 | Rescigno et al. | |
| 2003/0163430 A1 * | 8/2003 | Takaku | 705/52 |
| 2003/0163466 A1 | 8/2003 | Rajaraman et al. | |
| 2003/0182297 A1 | 9/2003 | Murakami et al. | 707/100 |
| 2003/0191738 A1 | 10/2003 | Hoeye et al. | |
| 2003/0216956 A1 * | 11/2003 | Smith et al. | 705/10 |
| 2004/0008864 A1 | 1/2004 | Watson et al. | |
| 2004/0010692 A1 | 1/2004 | Watson | |
| 2004/0010694 A1 | 1/2004 | Collens et al. | |
| 2004/0039661 A1 | 2/2004 | Fuzell-Casey et al. | |
| 2004/0044593 A1 * | 3/2004 | May | 705/28 |
| 2004/0044658 A1 | 3/2004 | Crabtree et al. | |
| 2004/0049537 A1 | 3/2004 | Titmuss | |
| 2004/0073921 A1 | 4/2004 | Neely et al. | |
| 2004/0114049 A1 | 6/2004 | Arora | |
| 2004/0136698 A1 | 7/2004 | Mock | 386/123 |
| 2004/0139064 A1 | 7/2004 | Chevallier et al. | |
| 2004/0151315 A1 * | 8/2004 | Kim | 380/241 |
| 2004/0166484 A1 | 8/2004 | Budke | |
| 2004/0166915 A1 | 8/2004 | Robarge | |
| 2004/0169683 A1 | 9/2004 | Chiu et al. | |
| 2004/0268017 A1 | 12/2004 | Uzrad-Nali et al. | |
| 2005/0004873 A1 | 1/2005 | Pou et al. | |
| 2005/0005191 A1 | 1/2005 | Judd | |
| 2005/0021362 A1 * | 1/2005 | Hasegawa et al. | 705/1 |
| 2005/0050103 A1 | 3/2005 | Kesteloot et al. | |
| 2005/0080788 A1 * | 4/2005 | Murata | 707/10 |
| 2005/0086069 A1 | 4/2005 | Watson et al. | |
| 2005/0091452 A1 | 4/2005 | Chen et al. | |
| 2005/0119977 A1 * | 6/2005 | Raciborski | 705/59 |
| 2005/0120053 A1 | 6/2005 | Watson | |
| 2005/0125405 A1 | 6/2005 | Watson | |
| 2005/0154892 A1 | 7/2005 | Mihcak et al. | |
| 2005/0182989 A1 | 8/2005 | Zarnke et al. | |
| 2005/0188280 A1 | 8/2005 | Ali | |
| 2005/0201726 A1 | 9/2005 | Malcolm et al. | |
| 2006/0004680 A1 | 1/2006 | Robarts et al. | |
| 2006/0031260 A1 | 2/2006 | Minezaki et al. | |
| 2006/0059098 A1 * | 3/2006 | Major et al. | 705/57 |
| 2006/0095300 A1 | 5/2006 | Schrier et al. | |
| 2006/0136502 A1 | 6/2006 | Williams et al. | 707/700 |
| 2007/0106901 A1 | 5/2007 | Collens et al. | |
| 2007/0118812 A1 | 5/2007 | Kesteloot et al. | |
| 2007/0240234 A1 | 10/2007 | Watson | |
| 2007/0276829 A1 * | 11/2007 | Wang et al. | 707/7 |

(56) References Cited

U.S. PATENT DOCUMENTS

FOREIGN PATENT DOCUMENTS

| JP | 07 281293 | 10/1995 |
| WO | WO 01/37479 | 5/2001 |
| WO | WO 02/073378 A2 | 9/2002 |
| WO | WO 02/075591 A1 | 9/2002 |
| WO | WO 2004/006168 | 1/2004 |
| WO | WO 2004/006494 | 1/2004 |
| WO | WO 2004/006559 | 1/2004 |
| WO | WO 2004/006579 | 1/2004 |
| WO | WO 2004/062945 A2 | 7/2004 |
| WO | WO 2004/064293 A2 | 7/2004 |
| WO | WO 2004/064372 A2 | 7/2004 |
| WO | WO 2004/070585 A2 | 8/2004 |
| WO | WO 2004/070998 A2 | 8/2004 |
| WO | WO 2005/009024 | 1/2005 |
| WO | WO 2005/079375 | 9/2005 |
| WO | WO 2005/086985 | 9/2005 |
| WO | WO 2006/025833 | 3/2006 |
| WO | WO 2006/055938 A2 | 5/2006 |

OTHER PUBLICATIONS

Dittman. "Combining digital watermarks and collusion secure fingerprints for customer copy monitoring." Secure Images and Image Authentication, The Institution of Electrical Engineers, 2000, pp. 1-6, IEEE London.

Fridrich. "Copyright protection of digital images (authentication)." Feb. 18, 2003, http://www.ws.binghamton.edu/fridrich/Research'tutor2.ppt.

Izquierdo. "Using invariant image features for synchronization in spread spectrum image watermarking." EURASIP Journal on Applied Processing, 2002, pp. 410-417, Hindawi Publishing Corp.

Rey et al. "A survey of watermarking algorithms for image authentication." EURASIP Journal on applied processing, 2002, 613-621, Hindawi Publishing Corp.

WIPO, WO 2006/055938 A3, International Search Report for PCT/US2005/042234, Jun. 13, 2006.

\* cited by examiner

SALES OF COLLECTIONS EXCLUDING THOSE ALREADY PURCHASED

BACKGROUND OF THE INVENTION

1. Field of the Invention

The invention relates to licenses and sales of collections of items, such as for example collections of movies, collections of music, collections of baseball cards, collections of coins, collections of books, collections of postage stamps, or collections of other such items; in aspects thereof, the invention relates to a user interface with which a user can interact with a local library server, with the effect of being able to make purchases to complete collections of objects conveniently, easily, quickly, and without substantial duplication.

2. Related Art

Collectables have been popular throughout history. Fads come and go and collectables; such as Beanie Babies, Lladro, and Pokemon are favorites among collectors. Companies, like the Franklin Mint, have established entire businesses around selling items that are part of collections to those who would collect them.

Media collections have long been popular: from record albums on vinyl to VHS and DVD movies. Film franchises have become very lucrative for motion picture companies. Blockbuster movies practically dictate multiple sequels. The same is true with television series and specials; ten or more seasons for a successful show is not uncommon. Distributors of DVD content have recognized the viewing public's interest in viewing this type of content on demand and have accommodated them by providing series sets with complete seasons, trilogies, and the like.

Problem: Completing Collections

A first known problem is that users often like to have these complete collections of series, such as for example "all Star Wars films," or "all episodes of Survivor," or "all films with Kate Beckinsale in them," or "all films directed by Quentin Tarantino." Unfortunately, it is difficult for the user to maintain the knowledge of which films they already own, and it would be undesirable for the user to buy multiple copies of movies as they try to complete a collection.

This problem is described herein with regard to collections of movies (such as imprinted on physical media like DVD's), but in general the described problem also applies to other types of collections, such as collections of music, collections of baseball cards, collections of coins, collections of books, collections of postage stamps, and the like.

Aspects of this problem are that "collections" of series might be defined in many different ways:

Easy Definitions of Collections
  The collection might be predefined by the seller, such as for example, all "Buffy the Vampire Slayer" episodes.
  The collection might be defined by a third party (not the seller), such as for example, predefined by a third party.
More Complex Definitions
  The collection or database might be defined in either a dynamic or static manner:
    An example of a collection defined in a static manner might include "all movies made in the 1930's".
    An example of a collection defined in a dynamic manner might include "all movies with Kate Beckinsale in them," as a new movie might be released next year meeting that criterion. Another example of a collection defined in a dynamic manner might include the "all time greatest selling 40 movies," as a new movie might cause that collection to change.
  The collection or database might be defined in either an objective or subjective manner:
    An example of a collection defined in a subjective manner might include those approved by a known critic or expert on a particular genre, perhaps with bookmarks or clippings included with the other media. One such example might include "Steve Swernofsky's 50 favorite movies and commentary thereon."
    An example of a collection defined in a subjective manner might include those that are private to an individual person, such as for example, "my favorite driving songs," "my favorite horror movies," or "my favorite science fiction thrillers without any aliens." In one embodiment, access to these private collections might be restricted to the user who created them.
    An example of a collection defined in a subjective manner might include a collection defined by interaction between a universal collection or database of possible items, and a query specifying a sub-collection of that universal collection or database. The "universal" collection or database itself, and the query applied to that database, might themselves be either or both dynamic or static.
      Once a collection is completely purchased, that collection might be updated by circumstances, such as when new media streams are produced or released for distribution. A collection of "all Star Wars films" would be updated every time there is a new such film, and a collection of "all episodes of the Sopranos" would be updated every time there is a new such episode (possibly as often as once per week). It is an object of the invention to make it easy for the users to update and complete their collections.
      Although queries applied to databases are often thought of as being Boolean in nature, involving comparisons, AND, and OR operators, there is no particular requirement in embodiments of the invention for restriction thereto. For example, a weighted distance or similarity metric, such as described in the "mosaic" application, might be workable, or other clustering techniques might be used.
  Collections Defined In Response To Their Elements
  In yet another example, the collection itself might be defined (consciously or unconsciously) by a user in a way that is difficult to describe in a structured way. The likes and dislikes of a user for media streams might typically involve one or more genres, such as "action" films, or "western" films, but it can be difficult to easily present all films likely to be wanted by the user in a convenient and easily-understood format. A collector of coins might only like gold coins and not silver coins or only gold coins that predate 1100 BC.
    Similarly, it might be difficult for the user to easily express what genres or collections they are looking for. For example, selecting all film versions of Shakespearean plays, including take-offs such as "West Side Story," might be quite inconvenient for the user to specify. This problem is similar if the user likes a particular genre, but dislikes a particular subgenre, such as liking all westerns except for those starring Ronald Reagan.
Partial Solutions: Completing Collections
Partial solutions to this known problem involve making it easier for the user to determine those items that fall within the collection the user wishes to define, with the effect of allowing the user to make purchases to complete collections of objects.

Speculative download or speculative ingestion allow the user to watch a movie with only the difficulty of entering payment information. However, this can still be a problem when the user indicates an entire group of movies to purchase, as a bulk purchase might involve entering payment information repeatedly. One known solution is the "shopping cart" model, but this does not offer the user any sense of security that their collection will be made complete.

The "guide" and "mosaic" techniques for presentation of movie titles or movie posters allow the user to more easily determine which items are "close" to particular items selected by the user, but there is still a difficulty in distinguishing which of those movies are already owned by the user (and thus available for immediate presentation) and which are not yet owned by the user (and thus only available after download or ingestion).

The "guide" and "mosaic" techniques for presentation also allow the user to more easily determine whether a particular item is "near" the preferences expressed by the user, but there is still a problem with relating user preferences (explicitly or implicitly specified) to suggested titles to buy, and there is no guarantee that a user will not accidentally purchase an item they already own.

Problem: How to "Complete" A Collection

A problem is that absence from the user's portion of the collection might be defined in one of multiple ways:

Multiple Copies: Most users will desire to own only one copy of any particular item, especially in the case of media streams. However, for some users, such as lending libraries or purchasers of multiple licenses to software, it might be desirable to own more than one copy of the media stream. In these cases, it might be desirable to ask the user for a criterion as to when the collection is complete, such as how many copies make for a "complete" collection.

Multiple Prices: It might sometimes be less expensive to purchase an entire collection rather than to purchase the individual items needed to complete that collection. Alternatively, there might be other collections sold as a unit that (individually or when grouped together) would allow the user to complete that collection. In these cases, it would be advantageous for the user to want to obtain the best possible coverage at the least cost.

Multiple Rights. Most users will desire, for each particular item, to own one copy of that item outright. However, for some types of items, especially media streams, the user might already have some rights to that item. In these cases, it would be advantageous for the user not to duplicate the rights they have in any particular item.

Multiple Versions. Most users will desire, for each particular item, to have only one version of that item. However, for some types of items (especially media streams), or for some users (especially avid collectors), it might be desirable to ask the user whether distinct versions should be considered different for purposes of completing the collection. For example, some users might prefer to have both the French version and the English version of the movie "Barbarella," while others would prefer to have only one or the other version.

Problem: Not Purchasing Duplicates

A problem is that, subject to the "multiple copies" problem described above, it would be advantageous to not order anything the user already owns. Accordingly, it would be preferable if it were easily possible to determine what the user owns without having to obtain any relatively large amount of information from the user.

In one embodiment, a system might keep a log of all media streams already owned by the user or a log of all media streams that have been imported by the user into the system, with the effect of incrementally providing the same result.

In alternative embodiments, a system might keep a log of hash ID's or secure hashes of known inputs, with the effect of providing the same results.

In still other embodiments, a system might use physical detection, such as RFID or GPS, to determine if physical objects are in fact owned by the user, with the effect of providing the same results. This embodiment would be effective when the objects themselves are physical and cannot easily be tracked electronically.

In still other embodiments, a system might include software and/or hardware associated with each owned object that announces the presence of that object.

Accordingly, it would be advantageous to provide a technique for being able to conveniently purchase collections of objects without duplicate purchases of objects in those collections already owned by the user. These and other advantages are described in other and further detail below.

SUMMARY OF THE INVENTION

The invention provides techniques, including methods and systems, as described below, capable of facilitating user interaction with a computing device such as a server device, with the effect of being able to conveniently purchase one or more items with the effect of providing the user with ownership of a substantially complete collection of items, and without duplication of items the user already has or is about to purchase, unless the user so desires such duplication.

Similarly, the invention also provides techniques, including methods and systems, as described below, capable of replenishing inventory as requested by the user. Unlike a fixed standing order, the user's existing inventory can be detected, and a vendor-designated addition to that inventory provided for the user's approval. The provided techniques are adjustable to provide for completing collections, where those collections might include only individual copies of each element, or might include multiple copies of selected elements. In some preferred embodiments, the actual values of the number of elements actually possessed by the user and the number of elements proffered by the vendor might change from time to time, with the techniques also checking those numbers from time to time, and requesting user approval for updating the user's existing inventory.

Similarly, the invention also provides techniques, including methods and systems, as described below, capable of distinguishing among multiple types of rights and multiple versions of products or services in the user's existing inventory. The provided techniques are adjustable to provide for actions as described above, including making those distinctions and either (1) preferring selected types of rights or versions as proffered by the vendor or requested by the user, or (2) obtaining the user's preference when those different types of rights or versions are available. Similarly to numerical count, in some preferred embodiments, the actual multiple types of rights and multiple versions of products or services actually possessed by the user or proffered by the vendor might change from time to time, with the techniques also checking those distinctions from time to time and acting accordingly.

After reading this application, those skilled in the art would recognize that the invention provides an enabling technology by which substantial advance is made in the art of user interfaces, particularly for collections, and more generally for doing business with relatively large databases. For example, the invention might be used to provide one or more of, or some combination or extension or mixture of, any of the following:

- Assisting a user in substantially completing a collection of goods or services, such as a collection of rights to media streams already partially owned by the user, with the effect of leveraging the user's probable desire to complete partial collections. For example, users with home collections of media streams might wish to create or maintain collections of substantially all media streams in a particular genre or series.
- Assisting a user in substantially replenishing an inventory of goods or services, such as a inventory of rights to media streams already partially owned by the user, with the effect of allowing the user to easily maintain a level of inventory without having to review that inventory from time to time. For example, users with retail businesses, or who have a use for goods or services which consume those goods or services from time to time, might wish to create or maintain a substantially regular inventory of those goods or services.
- Assisting a user in maintaining or creating a collection of goods or services compatible with that user's preferences, without the user having to explicitly describe the nature of that collection. For example, users who desire particular sets of media streams, but whose preferences are not easily described with respect to particular collections, descriptive terms, or genres that are standard among those proffered by vendors.
- Collecting and using information about express or implied user preferences, such as in response to preferred media streams selected by users from a relatively large database. For example, with this information, users might be presented with collections, descriptive terms, or genres that are not standard among those proffered by vendors, and offered the opportunity to substantially complete collections with respect to those preferences.

Accordingly, it would be advantageous to provide techniques, including methods and systems, capable of facilitating user interaction with a computing device such as a server device, with the effect of being able to conveniently purchase one or more items with the effect of providing the user with ownership of a substantially complete collection of items, and without duplication of items the user already has or is about to purchase, unless the user so desires such duplication.

INCORPORATED DISCLOSURE

Figure 1:
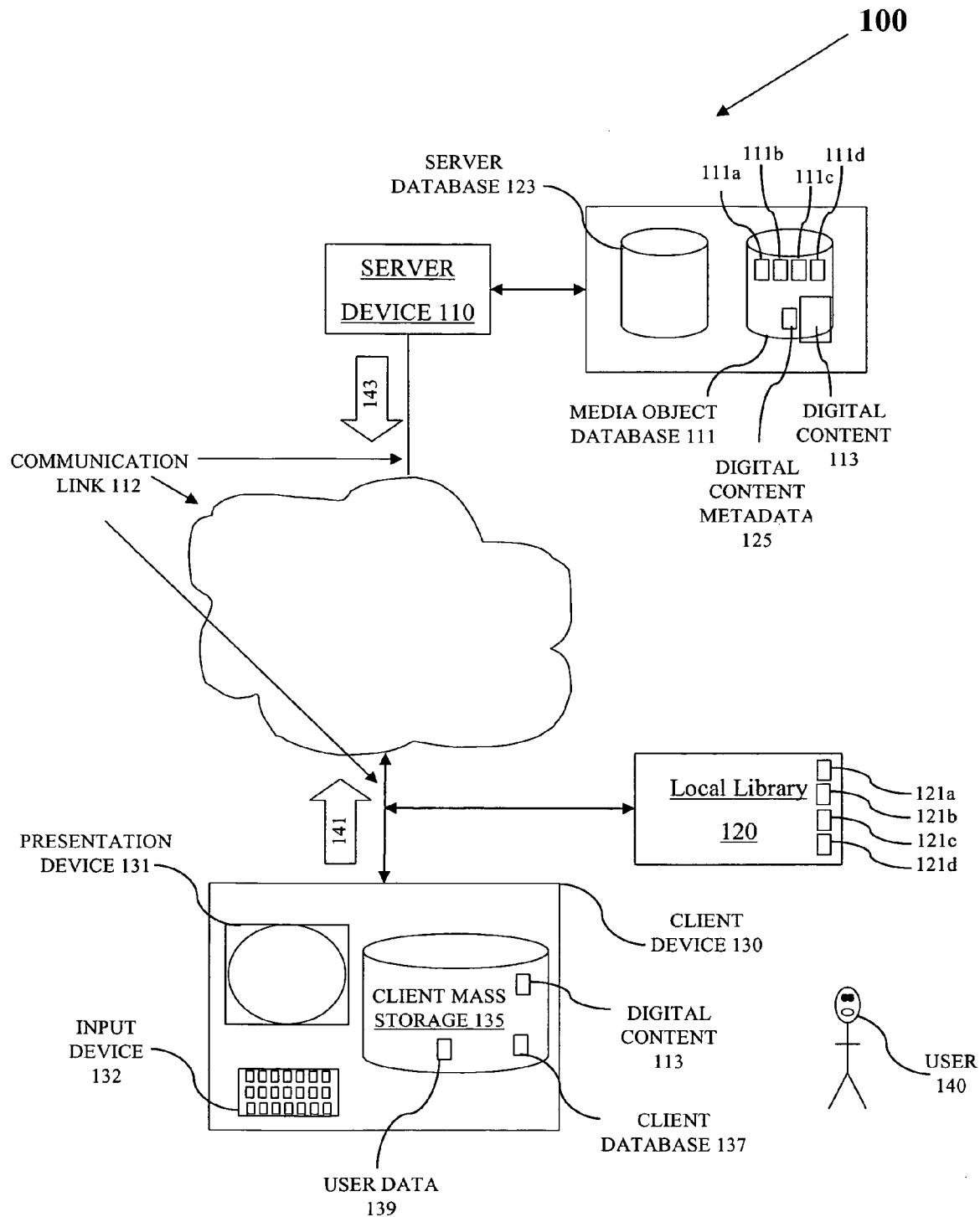
FIG. 1 shows a block diagram of a system capable of facilitating user interaction with a computing device such as a server device.

This application incorporates by reference and claims priority of at least the following documents.

U.S. patent application Ser. No. 10/418,739, filed Apr. 18, 2003, attorney docket number 217. 1018.01, titled "Mosaic-Like User Interface for Video Selection and Display".

U.S. patent application Ser. No. 10/418,949, filed Apr. 18, 2003, attorney docket number 217.1017.01, titled "Grid-Like Guided User Interface for Video Selection and Display".

U.S. patent application Ser. No. 10/964,566, filed Oct. 12, 2004, in the names of inventors Stephen WATSON and Michael MALCOLM, attorney docket number 217.1024.01, titled "Distinct Display of Media Streams Not Owned by a User".

U.S. patent application Ser. No. 10/964,565, filed Oct. 12, 2004, in the names of inventors Stephen WATSON and Lawrence KESTELOOT, attorney docket number 217.1030.01, titled "Separable Presentation Control Rules with Distinct Control Effects".

U.S. patent application Ser. No. 10/932,330, filed Aug. 31, 2004, in the names of inventors Lawrence KESTELOOT, Paul RECHSTEINER, and Michael MALCOLM, attorney docket number 217.1031.01, titled "Unique Features in Multiple DVD Sets".

U.S. patent application Ser. No. 10/936,789, filed Sep. 8, 2004, in the names of inventors Ian EPPERSON, Lawrence KESTELOOT, and Stephen WATSON, attorney docket number 217.1032.01, titled "Touch Panel User Inter-face".

These documents are hereby incorporated by reference as if fully set forth herein, and are sometimes referred to herein as the "incorporated disclosure". Inventions described herein can be used in combination or conjunction with technology described in the incorporated disclosure.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Definitions

The general meaning of each of these following terms is intended to be illustrative and in no way limiting.

The phrases "media stream", and the like, describe information intended for presentation in a sequence, such as motion pictures including a sequence of frames or fields, or such as audio including a sequence of sounds. As used herein, the phrase "media stream" has a broader meaning than the standard meaning for "streaming media," (of sound and pictures that are transmitted continuously using packets and that start to play before all of the content arrives). Rather, as described herein, there is no particular requirement that "media streams" must be delivered continuously. Also as described herein, media streams can refer to other information for presentation, such as for example animation or sound, as well as to still media, such as for example pictures or illustrations, and also to databases and other collections of information.

The phrases "digital content", and the like, describe data in a digital format, intended to represent media streams or other information for presentation to an end viewer. "Digital content" is distinguished from packaging information; such as for example message header information. For the two phrases "digital content" and "media stream," the former describes a selected encoding of the latter, while the latter describes a result of presenting any encoding thereof.

The term "DVD", the phrase "digital versatile disc", and the like, describe a technology standard capable of storing data.

The phrases "digital media," and the like, describe physical media capable of maintaining digital content in an accessible form. Digital media includes disk drives (including magnetic, optical, or magneto-optical disk drives), as well as any other physical media capable of maintaining information, such as digital content.

The phrases "DVD media content format," and the like, describe a family of encoding formats including DVD-audio and DVD-video (such as for example used with media including digital video disks or equivalents thereof). DVD media content format is a specific example of one of many possible formats in which digital content might be encoded.

The phrases "digital media," and the like, describe physical media capable of maintaining digital content in an accessible form. Digital media includes disk drives (including magnetic, optical, or magneto-optical disk drives), as well as any other physical media capable of maintaining information, such as digital content.

The terms "playback," "presentation," and the like, describe presentation (such as for example to one or more users) of audio, visual, or other features of media streams.

The phrase "content server", and the like, describe devices (or portions thereof, or sets of such devices or portions thereof) capable of sending digital content to recipients. For example, a content server might include a web server at which a user is provided the capability of purchasing digital media for download. In the context of the invention, there is no particular requirement that the server be (logically or physically) located at any particular address or place, or have any particular architecture, or use any particular protocol for communication. For example, the content server might include a process logically available to a local presentation device.

The scope and spirit of the invention is not limited to any of these definitions, or to specific examples mentioned therein, but is intended to include the most general concepts embodied by these and other terms.

System Elements

FIG. 1 shows a block diagram of a system capable of facilitating user interaction with a computing device such as a server device.

A system 100 includes elements shown in FIG. 1, plus possibly other elements as described in the incorporated disclosure. These elements include at least a server device 110, a local library 120, at least one client device 130, and a user 140.

The server device 110 includes elements shown in FIG. 1, plus possibly other elements as described in the incorporated disclosure. In one embodiment, these elements include at least a media object database 111, a communication link 112, and optionally a set of digital content 113 (or at least the capability for accessing digital content 113 from another device) as well as at least a processor, a main memory, mass storage, and software for executing instructions capable of operating the server device 110 consistent with the invention as further described herein. In one embodiment, the server device 110 includes at least a portion that is either physically, functionally, or logically remote from the local library 120. In one embodiment, the server device 110 is capable of downloading digital content 113, as described in the incorporated disclosure, in a cryptographically secure manner, also as described in the incorporated disclosure.

The media object database 111 includes elements shown in FIG. 1, plus possibly other elements as described in the incorporated disclosure. These elements include at least the following information.

Information 111a describing metadata associated with media objects, such as for example—a set of titles, actors, directors, genres, producers, ratings (e.g., motion picture ratings for sex or violence), release dates, remakes, sequels or prequels, series (e.g., ordering in a sequence of motion pictures of television episodes), or other and further associated works.

Information 111b describing the media object itself, such as for example a set of digital content comprising the media object or elements thereof.

Information 111c describing preferences expressed by other users or groups of users, such as for example a set of awards, collaborative preference information, recommendations or reviews (either by designated experts or friends), or other and further preference information about the media objects.

Information 111d not specifically related to media objects, such as for example, in a more generalized database, a set of access control information, access frequency, recently of access or alteration, or other and further information not specific to media streams.

Information 111a describing metadata includes elements shown in FIG. 1, plus possibly other elements as described in the incorporated disclosure. These elements include at least information specific to a particular media stream, group of media streams, or other databases or information. This information might include both information intrinsic to a media stream (such as for example actors, aspect ratio, MPAA rating, or running time) and information extrinsic to the media stream and associated therewith (such as for example price or availability).

The communication link 112 includes elements shown in FIG. 1, plus possibly other elements as described in the incorporated disclosure. In one embodiment, the communication link 112 includes internet access. More generally, the communication link 112 might include any possible technique for communication, presently known or unknown.

Digital content 113 includes elements shown in FIG. 1, plus possibly other elements as described in the incorporated disclosure. These elements include at least audio, video, and combinations thereof as used to present sound and images. For example, but without limitation, digital content 113 can represent media streams 111, such as for example including movies and songs as might be present on physical media such as Compact Discs, DVDs, Digital Audio Tape, and any other types of electronic computer storage devices.

A local library 120 includes elements shown in FIG. 1, plus possibly other elements as described in the incorporated disclosure. These elements might include the following information.

Information 121a describing metadata associated with media objects, similar to information 111a described above.

Information 121b describing the media object itself, similar to information 111b described above.

Information 121c describing preferences expressed by users of the local library 120, similar to information 111c described above.

Information 121*d* not specifically related to media objects, and particular to the local library, similar to information 111*d* described above.

A client device 130 includes elements shown in FIG. 1, plus possibly other elements as described in the incorporated disclosure. These elements include at least at least one presentation device 131, at least one input device 132, a mass storage, and software for executing instructions (not shown, but understood by one skilled in the art), as well as at least a processor, main memory, and storage. This software preferably includes communications and control software capable of operating the client device 130 consistent with the invention as further explained herein.

The presentation device 131 includes elements shown in FIG. 1, plus possibly other elements as described in the incorporated disclosure. These elements include at least a device capable of presenting information as described above. The presentation device 131 may include a CRT (such as a television or RGB type computer monitor), flat panel display, a projection display or screen, or other or further types of devices for displaying or presenting information. In one embodiment, the client device 130 and the presentation device 131 are included in separate physical devices; however, in the context of the invention there is no particular requirement therefor. In alternative embodiments, the client device 130 and the presentation device 131 may be included in one device, or other or further types of systems not described herein.

The input device 132 includes elements shown in FIG. 1, plus possibly other elements as described in the incorporated disclosure. These elements include at least a device capable of receiving information, such as for example commands or information. In a preferred embodiment, the input device 132 includes a touch screen. In alternative embodiments, the input device 132 may include any combination of a computer keyboard and computer mouse, track-ball, touch screen, television remote control, or other or further devices not described herein.

A user 140 includes elements shown in FIG. 1, plus possibly other elements as described in the incorporated disclosure. These elements include at least a human user, or a substitute therefore, such as for example a computer program capable of acting on behalf of a human user (or a group thereof), or an Artificial Intelligence capable of expressing preferences similarly to a human user.

User Interface Concepts

Figure 2:
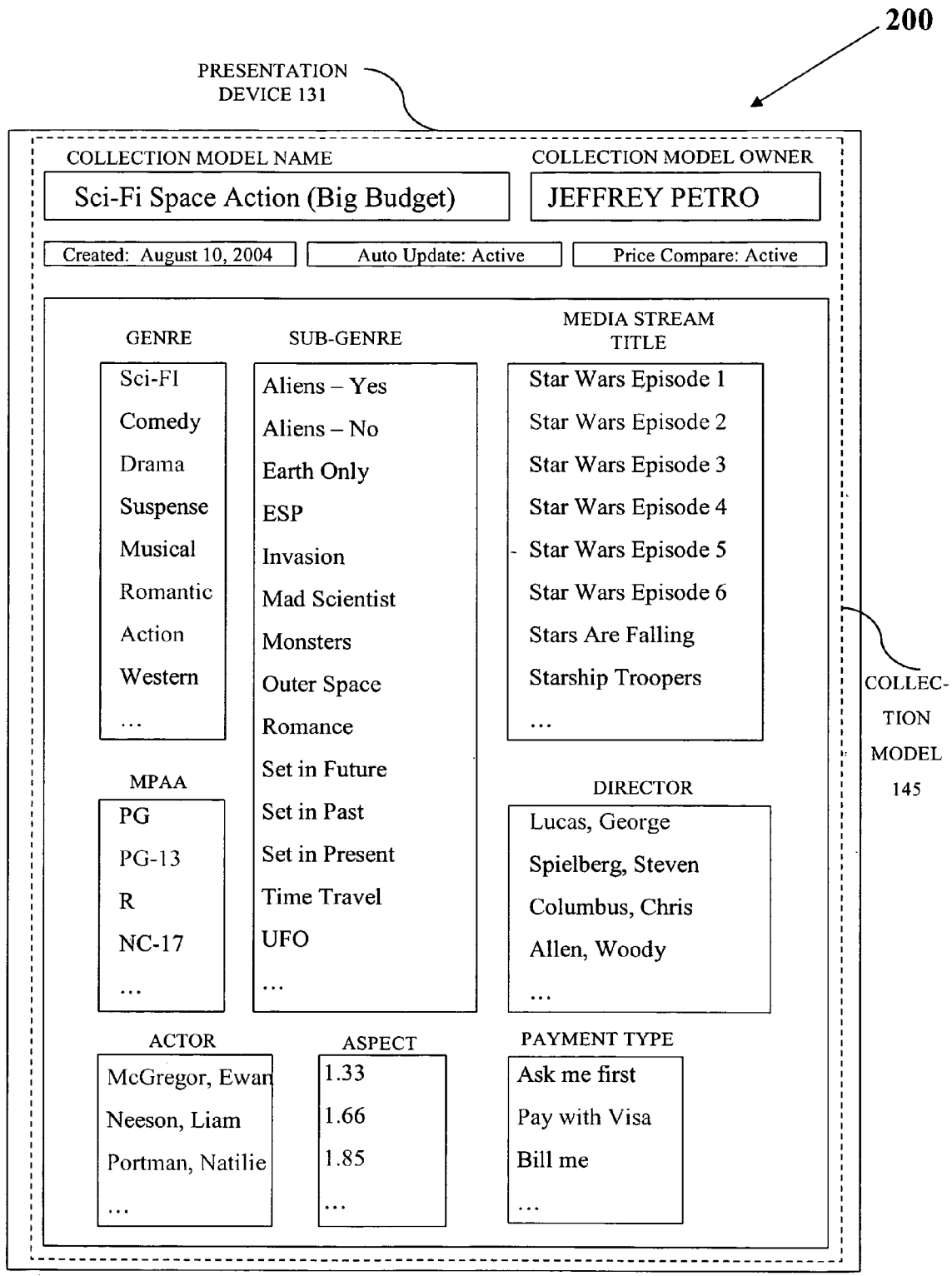
FIG. 2 shows an illustration of a screen for user editing of collection models in a system for sales of bundled collections excluding those already purchased.

FIG. 2 shows an illustration of a screen for user editing of collection models in a system for sales of bundled collections excluding those already purchased.

In a preferred embodiment the user 140 customizes parameters of the system to make the system more responsive and efficient to their needs. This is not a requirement as the system includes its own set of default values.

Customizable parameters are stored in the user data 139 and include; 1) collection models 145, 2) payment data, and 3) other information.

Collection models 145 include specific information defining the attributes necessary for a media stream ill to be included in that collection model 145. The system 100 includes many predefined collection models 145. New collection models 145 can be created and existing ones can be edited. For example, but without limitation, a collection model 145 could include the following attributes:
 1. Science fiction
 2. Includes time travel
 3. Does not include aliens
 4. Includes martial arts
 5. Set on Earth
 6. 1990 release or later
 7. Hollywood production
 8. Widescreen aspect ratios only Attributes for collection models 145 are preferably predefined such that they can be correlated with similar information available at the server device 110. The user 140 may at any time define a new collection model 145 by selecting a set of attributes and grouping them under a title, such as, "Modern Action Time Travel Movies." Preferably, the user 140 defines the title and then selects which attributes to include. The selection process in easily accomplished using lists, dropdown menus, dialog boxes, and similar selection techniques known in the art.

A collection model 145 includes not only information intrinsic to the media stream 111, but also to the externally related factors, such as, what price the user 140 is willing to pay and payment type (Visa, American Express, etc.).

Collection models 145 are specifically advantageous where bundled collections of media streams 111 are concerned. The client device 130 is in regular contact with the server device 110. If a user 140 has defined a collection model 145 that identifies a now available media stream 111, the media stream 111 can be purchased and delivered to the user 140 such that the overall collection of a user 140 remains up-to-date.

For example, a user 140 may have defined a simple collection model 145 as follows:
 1. Media stream main title: The Sopranos
 2. Auto purchase any new release (Visa)
 3. Do not purchase duplicative special editions etc.
 4. Price compare active Using the collection model 145 above, the system 100 would auto purchase any new release of the "Sopranos" cable television series and charge it to a Visa Card. The system would not purchase any special editions of episodes already owned. The system would price compare buying any newly released episodes individually against buying them as a set to determine if buying the set is cheaper even though it may mean duplication of some media streams 111.

The system also includes automatically generated and default collection models 145 and collection models 145 supplied in the system 100. An example of supplied collection models 145 includes:
 Musicals (1950-1959)
 Spaghetti Westerns directed by Sergio Leone
 Star Wars
 Starring: Cameron Diaz
 Saturday Night Live
 Days of Our Lives (1989-1991)
 Directed by: Stephen Spielberg
 Composed by: John Williams
 Hong Kong Chop Socky (1970-1979)

The system 100 can generate collection models 145 automatically by analyzing user data 139, digital content 113, the client database 137, and digital content metadata 125. For example, the system may determine that the actor most often found on media streams 111 owned by the user 140 is Al Pacino. The system can then automatically create a collection model 145 that will alert the user 140 when new movies are released starring Al Pacino, or the system may suggest to the user 140 the existing movies starring Al Pacino that the user 140 does not own. Trailers or excerpts from such movies can be made available to the user 140 to promote a sale.

Automatically generated collection models 145 may be saved or discarded by the user 140. The user 140 may also take a collection model 145 automatically generated by the system 100 and use it as a starting point for creating new collection models 145. Thus, in the previous example, the user 140 could take the Al Pacino collection model 145 and modify it to include only movies starring Al Pacino from 1972 through 1984. Collection models 145 may also be shared between a first user 140 and a second user 140. New collection models 145 may also be available from a vendor individually or as collections. Generally, a fee is charged by the vendor for additional vendor-supplied collection models 145.

When more than one user 140 uses the same system, each user 140 may chose to lock their collection models 145 and their portion of the media streams. This allows a user 140 to keep their preferences private and confidential.

The number of attributes associated with digital content grows daily. New media streams 111, crew, cast members, and the like are being created as a part of the entertainment industry. Thus, every unit of digital content 113 purchased by a user 140 has the possibility of being an object of a new automatically generated collection model 145. The user 140 has the ability to adjust a set of options that control automatically generated collection models 145. These options include (but are not limited to) the ability to set field thresholds, field matching values, and field aggregate values. By setting at least some of these values appropriately, the system 100 would not query the user 140 with a question, such as "you own (1) movie starring John Wayne, would you like to complete your collection by purchasing the other 173?" The user 140 could in this case set the threshold to be prompted when the percentage of movies necessary to complete a collection based on a starring movie actor is less than 10%.

Thus, the system 100 operates either in some level of a default mode to locate digital content 113 likely to be of interest of the user 140 and either queries the user 140 for purchase instructions or automatically purchases the media streams 111, or the system 100 operates in a user-customized mode to locate digital content 113 specifically identified by the user 140 to have a high probability of being desired and either queries the user 140 for purchase instructions or automatically purchases the digital content 113.

The user 140 may define their own attributes. Attributes may be defined statically or dynamically. For example, but without limitation, a statically defined attribute may include the era that a movie is set in. A derived attribute can include logic that calculates the ratio of male to female actors in a movie or collection of movies. This feature is preferably supported using a user-editable language and/or a set of attributes stored in a library that are user-definable and otherwise editable.

The system presents, for example, a set of elements on a screen where the elements represent collections or bundles of objects, such as movies. The system can present the elements differently in response to:
 whether the objects are offered as part of a collection;
 whether the objects are offered at a discount if purchased together;
 and the like.

The system presents a set of elements on screen with the effect that some elements represent "bundles", that is, collections of objects. The user 140 can select one or more elements and the system performs an action in response to the user's selection. The action the system performs can be:
 Buy all the objects in the bundles represented by the selected elements without fear of duplication of objects in the bundles or already owned by the user, unless so desired. That is, no object already owned by the user 140 will be in the current set of objects being purchased, unless the user 140 so desires. For example, if a user 140 is buying a collection known as "Prison Escape Movies" and is also buying a collection known as "The Steve McQueen Collection", the system would not only avoid purchasing movies that the user 140 already owns but would also avoid buying duplicates of titles that are common to both collections. In this case, it is likely that "The Great Escape" would be in both collections. In some cases, certain movies may only be offered as sets and then duplication would be unavoidable.
 Try-and-buy, rent, view an advertisement for, or enjoy another enticement for, all the objects in the bundles represented by the selected elements without fear of duplication of objects in the bundles or already owned by the user 140, unless so desired.

Method of Operation

Figure 3:
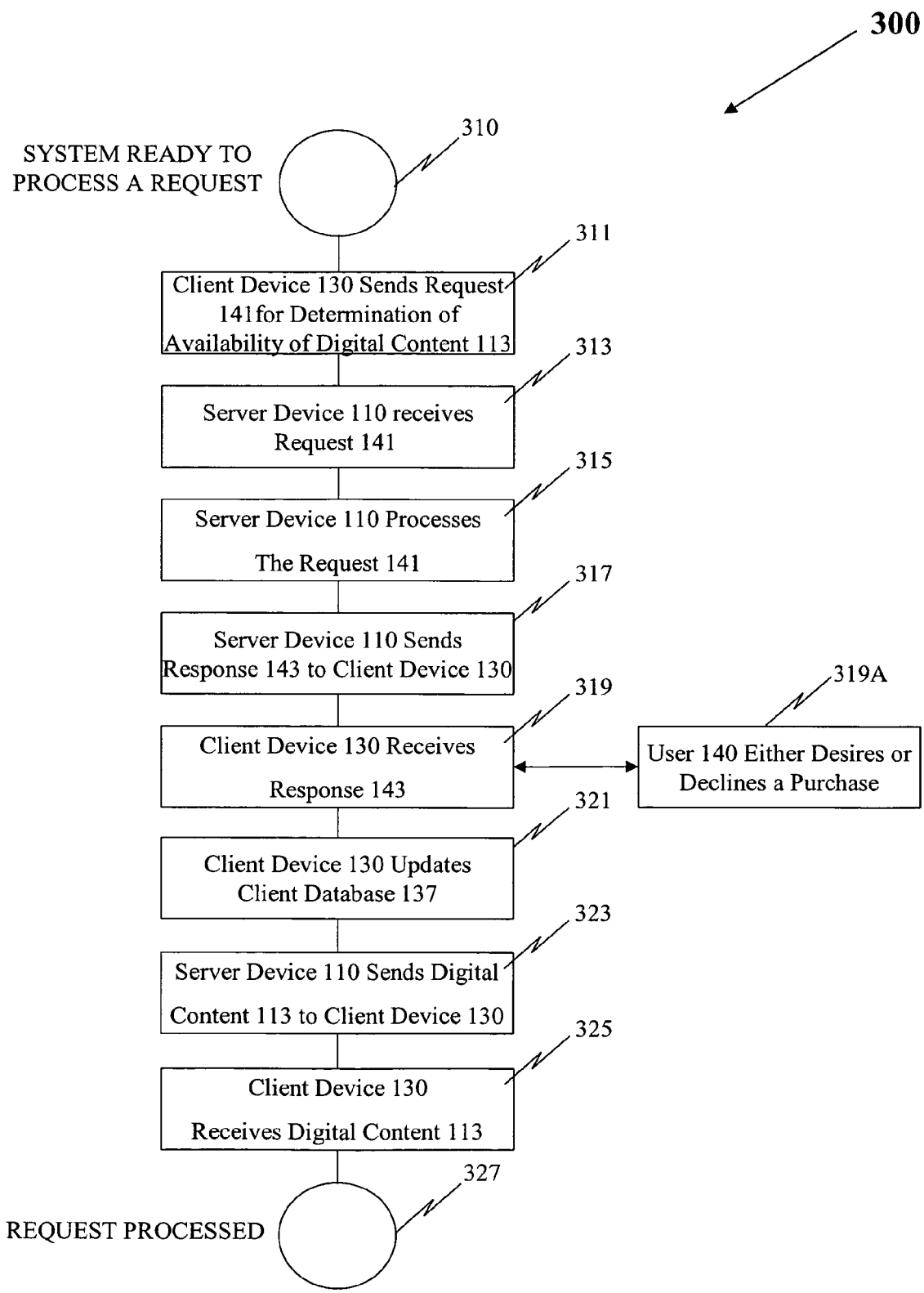
FIG. 3 shows a process flow diagram for sales of bundled collections excluding those already purchased.

FIG. 3 shows a process flow diagram for sales of bundled collections excluding those already purchased.

A method 300 includes a set of flow points and steps. Although described serially, these flow points and steps of the method 300 can be performed by separate elements in conjunction or in parallel, whether a synchronously or synchronously, in a pipelined manner, or otherwise. There is no particular requirement that the flow points or steps must be performed in the same order as described, except where explicitly so indicated.

At a flow point 310, the system is ready to process a request 141.

At a step 311, the client device 130 sends a request 141 to the server device 110. The request 141 includes information regarding collection models 145 that specifically or generally identify movies or movie types the user 140 is looking for to complete movie collections.

At a step 313, the server device 110 receives the request 141.

At a step 315, the server device 110 processes the request 141. Since a request 141 can contain many facets of information, the request 141 can be parsed into separate components to be handled at the server device 110. The availability of specifically identified media stream titles can be searched in the server database 123 as can statically and dynamically identified media streams 111 through the associated digital content metadata 125. Thus if the user 140 has identified criteria that states they always purchase XXX rated movies starring Busty Bubbles, the MPAA rating and movie star can be gleaned from the digital content metadata 125.

At a step 317, the server device 110 sends a response 143 to the client device 130.

At a step 319, the client device 130 receives a response 143 from the server device 110. The response 143 may require parsing at the client device 130. The response 143 preferably includes the results of the request 141. If no new media streams 111 are available that meet the parameters of the request 141, the response 143 includes a message to the user 140 informing them of this fact. Other information may be included, such as identification of media streams 111 that may be of interest to the user 140, but which did not exactly match a collection model 145. If new media streams 111 desired by the user 140 have been identified, the system informs the user 140 of such. The user 140 may or may not have asked that the system 100 inform him of the availability before purchasing.

The ability of the system 100 to optionally (at the command of the user 140) notify the user 140 of the availability of media streams 111 without automatically purchasing them gives the user 140 additional flexibility in completing their collections. For example, the user 140 may have set up a collection model 145 entitled "Haunted Hollow 1-2-3." The user 140 may not have seen the final installment of the trilogy, and even though they liked the first movie, worry it may be as bad as the second installment they just saw and thus may not want the third installment.

If the response 143 to the user 140 indicates that one or more movies meet the parameters of a collection model 145 and includes asking the user 140 to give the goahead, an additional step 319A is required. At step 319A, the user 140 either desires or declines a purchase. If the user 140 declines, no payment is sent and no purchase transaction is executed. If the user 140 desires to make the purchase, a separate request 141 is sent that includes collection model parameters for the specific media stream 111 in question along with automatic payment criteria.

At a step 321, the client device 130 updates the client database 137 with information contained in the response 143. If a media stream 111 has been automatically purchased, the client database 137 would be updated to indicate the purchase and the status of the media stream 111 (for example: purchased & in-transit, purchased & available, purchased & pending release). An invoice may also be included in the response 143. In a preferred embodiment, media streams 111 are sent independently of the response 143. In an alternative embodiment of the invention, media streams 111 are included as part of a response 143.

At a step 323, the server device 110 sends one or more media streams 111 to the client device 130. In the case of non-electronically transferable objects, the objects are delivered in a method consistent with the object type, such as by U.S. Mail, United Parcel Service (UPS), Federal Express, and the like.

At a step 325, the client device 130 receives the media streams 111. The media streams 111 are stored on the client mass storage 135. The client device 130 updates the client database 137 to indicate that the media streams 111 are now present on the client mass storage 135 and available for viewing by the user 140.

At a flow point 327, a request 141 has been processed.

Alternative Embodiments

Although preferred embodiments are disclosed herein, many variations are possible which remain within the concept, scope, and spirit of the invention. These variations would become clear to those skilled in the art after perusal of this application.

For example, the invention is not restricted to media stream collection, but is also applicable to all collectables and objects that may be logically grouped, such as for example Lladro, baseball cards, books, postage stamps, coins, toys, computer games, and to presentation of databases and other collections of information, or of user interfaces associated with operating systems or application software.

Those skilled in the art will recognize, after perusal of this application, that these alternative embodiments are illustrative and in no way limiting.

The invention claimed is:

1. A method, comprising:
   maintaining a database on a digital media storage device, said database including a first plurality of digital media items;
   defining a digital media collection, comprising a list of a second plurality of digital media items, each having a similar set of characteristics, said characteristics indicative of intrinsic and extrinsic features of said digital media items;
   based at least in part on information regarding said defined digital media collection, automatically identifying a set of digital media items present in said second plurality and not present in said first plurality;
   determining if a threshold number of digital media items present in said second plurality are present in said first plurality; and
   in response to said determining, specifying, without user intervention, a commercial transaction to obtain said set of digital media items, such that said database would contain a complete copy of said defined digital media collection,
   wherein the method is performed by one or more processors.

2. The method of claim 1, wherein said defining is performed by a combination of a vendor and a user.

3. The method of claim 1, wherein said intrinsic features include one or more of: 1) aspect ratio, 2) cast and crew, 3) media stream lengths, 4) MPAA rating, 5) audio encoding, and 6) extra footage.

4. The method of claim 1, wherein said extrinsic features include one or more of: 1) price, 2) availability, 3) user preferences, and 4) vendor preferences.

5. The method of claim 1, wherein said defining is based on an intrinsic feature.

6. The method of claim 1, wherein said defining is based on an extrinsic feature.

7. The method of claim 1, wherein said defining is based on a combination of intrinsic and extrinsic features.

8. The method of claim 1, including completing said specified commercial transaction.

9. The method of claim 1, including:
   modifying said specified commercial transaction to create a modified commercial transaction; and
   completing said modified commercial transaction.

10. The method of claim 1, including allowing a user to opt to automatically complete said specified commercial transaction.

11. The method of claim 1, wherein said threshold number depends on a number of digital media items present in said first plurality of digital media items.

12. The method of claim 1, wherein said threshold number does not depend on a number of digital media items present in said first plurality of digital media items.

13. A method, comprising;
   maintaining a first database and a second database, wherein said first database is logically related to a user and maintained on a digital media storage device, and wherein said second database is logically related to a vendor;
   defining a collection model, wherein said defined collection model includes a set of selected features indicative of a class of preferred items;
   based at least in part on said defined collection model, automatically identifying a set of items in said second database not present in said first database;
   determining if a threshold number of digital media items present in said second database are present in said first database; and
   in response to said determining, specifying, without user intervention, a commercial transaction to obtain said identified set of items,
   wherein the method is performed by one or more processors.

14. The method of claim 13, wherein said defining is predefined by a system provider.

15. The method of claim 13, including completing said specified commercial transaction.

16. The method of claim 13, including:
modifying said specified commercial transaction to create a modified commercial transaction; and
completing said modified commercial transaction.

17. The method of claim 13, including allowing a user to opt to automatically complete said specified commercial transaction.

18. A method, comprising:
comparing a user media library with a digital media collection, wherein said user media library comprises a plurality of digital media accessible via a digital media storage device, and said digital media collection comprises a first listing of digital media items with a shared characteristic;
based at least in part on said shared characteristic, automatically identifying a set of digital media items from said digital media collection not present in said user media library;
dynamically updating said digital media collection with a second listing of digital media items;
examining said user media library with reference to a threshold value, wherein said threshold value indicates how many of said first or second listing of digital media items with a shared characteristic should appear in said user media library.
comparing said user media library with said updated digital media collection; and
if said threshold value is exceeded, preparing a commercial transaction to obtain each of said set of digital media items, if available, from a specified vendor for inclusion in said user media library,
wherein the method is performed by one or more processors.

19. The method of claim 18, wherein said comparing comprises examining a log corresponding to the contents of said user media library.

20. The method of claim 18, further comprising:
maintaining said user media library.

21. The method of claim 18, further comprising:
determining whether a specific item from said set of digital media items is available.

22. The method of claim 21, further comprising:
obtaining said specific item for inclusion in said user media library.

23. The method of claim 21, wherein said determining further comprises determining whether said specific item is available from a specified vendor.

24. The method of claim 23, further comprising:
obtaining said specific item from said specified vendor for inclusion in said user media library.

25. The method of claim 23, further comprising:
preparing a commercial transaction to obtain said specific item from said specified vendor for inclusion in said user media library.

26. The method of claim 18, further comprising:
obtaining each of said set of digital media items, if available, for inclusion in said user media library.

27. The method of claim 18, further comprising:
preparing a commercial transaction to obtain each of said set of digital media items, if available, from a specified vendor for inclusion in said user media library.

28. The method of claim 18, wherein said shared characteristic comprises metadata associated with each digital media item included in said first or second listing.

29. The method of claim 18, wherein said shared characteristic comprises at least one of the following: genre; director; actor; rating; award nominations; or award recipient.

30. The method of claim 18, wherein said shared characteristic is defined by a user associated with said user media library.

31. The method of claim 18, wherein said shared characteristic is defined by a vendor.

32. The method of claim 18, further comprising:
generating said digital media collection with reference to said user media library.

33. The method of claim 32, wherein said generating comprises:
examining said user media library to identify a plurality of digital media items having said shared characteristic; and
accessing a database of digital media information to identify other digital media items having said shared characteristic.

34. The method of claim 18, further comprising:
periodically repeating said comparing and said identifying.

35. The method of claim 18, further comprising:
comparing a first proposed commercial transaction to obtain said set of digital media items with a second proposed commercial transaction to obtain said set of digital media items, in order to determine a preferred commercial transaction, wherein said first proposed commercial transaction prevents obtaining a digital media item already present in said user media library, and said second proposed commercial transaction allows obtaining a digital media item already present in said user media library.

36. The method of claim 18, further comprising:
comparing said user media library with a plurality of digital media collections, wherein each of said plurality of digital media collections comprises a third listing of digital media items with a different shared characteristic; and
automatically identifying a set of digital media items from each of said plurality of digital media collections not present in said user media library.

37. The method of claim 18, wherein said comparing comprises determining a set of rights corresponding to said plurality of digital media.

38. The method of claim 37, further comprising:
obtaining said rights, from said set of rights, corresponding to said set of digital media items from said digital media collection.

39. A system, comprising:
means for comparing a user media library with a digital media collection, wherein said user media library comprises a plurality of digital media accessible via a digital media storage device, and said digital media collection comprises a first listing of digital media items with a shared characteristic;
means for automatically identifying a set of digital media items from said digital media collection not present in said user media library, wherein said identifying said set of digital media items is based at least in part on said shared characteristic;
means for dynamically updating said digital media collection with a second listing of digital media items;
means for examining said user media library with reference to a threshold value, wherein said threshold value indicates how many of said first or second listing of digital media items with a shared characteristic should appear in said user media library. means for comparing said user media library with said updated digital media collection; and means for preparing a commercial transaction to obtain each of said set of digital media items, if available, from a specified vendor for inclusion in said user media library, if said threshold value is exceeded.

40. The system of claim 39, wherein said means for comparing examines a log corresponding to the contents of said user media library.

41. The system of claim 39, further comprising:

means for maintaining said user media library.

42. The system of claim 39, further comprising:

means for determining whether a specific item from said set of digital media items is available.

43. The system of claim 42, further comprising:

means for obtaining said specific item for inclusion in said user media library.

44. The system of claim 42, wherein said means for determining further determines whether said specific item is available from a specified vendor.

45. The system of claim 44, further comprising:

means for obtaining said specific item from said specified vendor for inclusion in said user media library.

46. The system of claim 44, further comprising:

preparing a commercial transaction to obtain said specific item from said specified vendor for inclusion in said user media library.

47. The system of claim 39, wherein said shared characteristic comprises metadata associated with each digital media item included in said first or second listing.

48. The system of claim 39, wherein said shared characteristic comprises at least one of the following: genre; director; actor; rating; award nominations; or award recipient.

49. The system of claim 39, wherein said shared characteristic is defined by a user associated with said user media library.

50. The system of claim 39, wherein said shared characteristic is defined by a vendor.

51. The system of claim 39, further comprising:

means for generating said digital media collection with reference to said user media library.

52. The system of claim 51, wherein said means for generating comprises:

means for examining said user media library to intensify a plurality of digital media items having said shared characteristic; and means for accessing a database of digital media information to identify other digital media items having said shared characteristic.

53. The system of claim 39, further comprising:

means for comparing said user media library with a plurality of digital media collections, wherein each of said plurality of digital media collections comprises a third listing of digital media items with a different shared characteristic; and means for automatically identifying a set of digital media items from each of said plurality of digital media collections not present in said user media library.

54. A system, comprising:

a device including a processor and a database, wherein the database includes a second plurality of digital media items; and wherein the processor is configured to:

receive a request regarding a digital media collection;

based at least in part on the request, compare a list of the second plurality to a list of a first plurality of digital media items, wherein items on the list of the second plurality of digital media items share a similar set of characteristics, the set of characteristics indicative of intrinsic and extrinsic features of the second plurality of the digital media items;

based at least in part on information regarding the digital media collection, automatically identify a set of digital media items present in the second plurality and not present in the first plurality;

determine if a threshold number of digital media items present in the second plurality are present in said first plurality; and in response to the determination, specify, without user intervention, a commercial transaction to obtain the set of digital media items, such that the device offers for sale the set of digital media items.

55. The system of claim 54, wherein the processor is configured to complete the specified commercial transaction by a user.

* * * * *